(12) United States Patent
Xu et al.

(10) Patent No.: US 6,715,741 B2
(45) Date of Patent: Apr. 6, 2004

(54) INCREASED EFFICIENCY FRACTIONAL DISTILLATION TRAY

(76) Inventors: Zhanping Xu, UOP LLC 175 E. Park Dr., Tonawanda, NY (US) 15150; Nicholas F. Urbanski, UOP LLC 175 E. Park Dr., Tonawanda, NY (US) 15150

( * ) Notice: Subject to any disclaimer, the term of this patent is extended or adjusted under 35 U.S.C. 154(b) by 31 days.

(21) Appl. No.: 10/420,997

(22) Filed: Apr. 22, 2003

(65) Prior Publication Data

US 2003/0193099 A1 Oct. 16, 2003

Related U.S. Application Data

(62) Division of application No. 09/586,059, filed on Jun. 2, 2000, now Pat. No. 6,568,663.

(51) Int. Cl.$^7$ ................................................ B01F 3/04
(52) U.S. Cl. ................................ 261/114.1; 261/114.5
(58) Field of Search ........................ 261/114.1, 114.2, 261/114.3, 114.4, 114.5

(56) References Cited

U.S. PATENT DOCUMENTS

| | | | |
|---|---|---|---|
| 3,410,540 A | 11/1968 | Bruckert ................. | 261/113 |
| 4,159,291 A | 6/1979 | Bruckert et al. ......... | 261/114.1 |
| 4,550,000 A | 10/1985 | Bentham ................. | 261/114.1 |
| 5,209,875 A | 5/1993 | Miller et al. ............ | 261/114.1 |
| 5,573,714 A | 11/1996 | Monkelbaan et al. ..... | 261/114.5 |
| 6,116,583 A | 9/2000 | Agnello ................. | 261/114.1 |
| 6,131,891 A | 10/2000 | Resetarits et al. ....... | 261/114.1 |
| 6,371,454 B1 | 4/2002 | Gerla et al. ............. | 261/114.1 |
| 6,390,454 B1 | 5/2002 | Urbanski et al. ........ | 261/114.1 |
| 6,568,663 B1 * | 5/2003 | Xu et al. ................. | 261/114.1 |
| 2001/0013667 A1 * | 8/2001 | Konijn .................... | 261/114.1 |

FOREIGN PATENT DOCUMENTS

| | | |
|---|---|---|
| DE | 2011870 | 9/1971 |
| NL | 38354 | 1/1936 |

OTHER PUBLICATIONS

Sloley, A.W. *High–Capacity Distillation* Hydrocarbon Processing, Aug. 1998 pp. 53–96.
Sloley, A.W. *Should You Switch to High Capacity Trays*? Chemical Engineering Progress, Jan. 1999 pp. 23–25.

* cited by examiner

Primary Examiner—C. Scott Bushey

(57) ABSTRACT

The efficiency of multiple down comer fractional distillation trays is improved by distributing the liquid egressing from the bottom of the downcomers in a manner which provides a uniform length liquid flow path on the next lower tray. This is accomplished by liquid distribution devices suspended below the downcomers of the upper tray, with the devices running parallel to the downcomers of the next lower tray and being adapted to collect the falling liquid and then disperse it onto the decking below along the length of the lower downcomers through openings in the distribution device.

11 Claims, 6 Drawing Sheets

INCREASED EFFICIENCY FRACTIONAL DISTILLATION TRAY

CROSS-REFERENCE TO RELATED APPLICATION

This application is a Division of application Ser. No. 09/586,059 filed Jun. 2, 2000, now U.S. Pat. No. 6,568,663 the contents of which are hereby incorporated by reference in its entirety.

BACKGROUND OF THE INVENTION

1. Field of the Invention

The invention relates to an apparatus for increasing the efficiency of fractional distillation trays. The invention more specifically relates to a process and apparatus providing a higher efficiency multiple downcomer fractionation tray.

2. Related Art

Multiple downcomer fractionation trays were introduced by U.S. Pat. No. 3,410,540 issued to W. Bruckert. This reference describes the characteristic structure and arrangement of the components of a multiple downcomer tray. These include long, narrow, trough-like downcomers spread across the tray with long rectangular areas of tray decking separating the downcomers. The traditional rectangular shape of the downcomers and transverse arrangement of downcomers on vertically adjacent trays is also shown.

Multiple downcomer trays are noted for their high capacity. They were therefore included in an article entitled "High-Capacity Distillation" published at page 53 of the August 1998 edition of *Hydrocarbon Processing* and in an article starting at page 23 of the January 1999 edition of *Chemical Engineering Process*. These articles show the transverse arrangement of the downcomers on vertically adjacent trays and describe the flow of vapor and liquid through fractionation columns employing these trays.

Liquid which falls from the bottom of a downcomer of a multiple downcomer tray falls onto the active vapor-liquid contacting area of the next lower tray. It has been recognized in the art that the liquid falling on the decking could penetrate the decking, thus bypassing the intended vapor-liquid contacting. U.S. Pat. No. 5,209,875 introduced the use of antipenetration pans suspended between the decking and the downcomer to reconcile this problem. The antipenetration pans are located under the liquid outlets of the upper tray's downcomer and oriented perpendicular to the downcomers of the lower tray. Liquid exiting the downcomers falls upon the pans and then flows onto the decking of the lower tray.

BRIEF SUMMARY OF THE INVENTION

The invention is a novel apparatus designed to increase the efficiency of fractionation columns which contain multiple downcomer fractionation trays. The apparatus comprises a liquid distribution pan suspended between vertically adjacent trays which are mounted transverse to each other. The distribution pan collects liquid emanating from the downcomer of the upper tray and then discharges it in a desired pattern across the active decking area of the next lower tray. This causes the liquid to fall upon the lower tray at a set uniform distance from the inlet to the downcomer of the lower tray. All of the liquid then has a uniform residence time upon the tray, thus increasing the separation efficiency of the tray.

BRIEF DESCRIPTION OF THE DRAWINGS

The working of the invention and the typical arrangement and variations in parts of the apparatus will be described through use of the accompanying drawings in which.

DETAILED DESCRIPTION AND PREFERRED EMBODIMENTS

Figure 1:
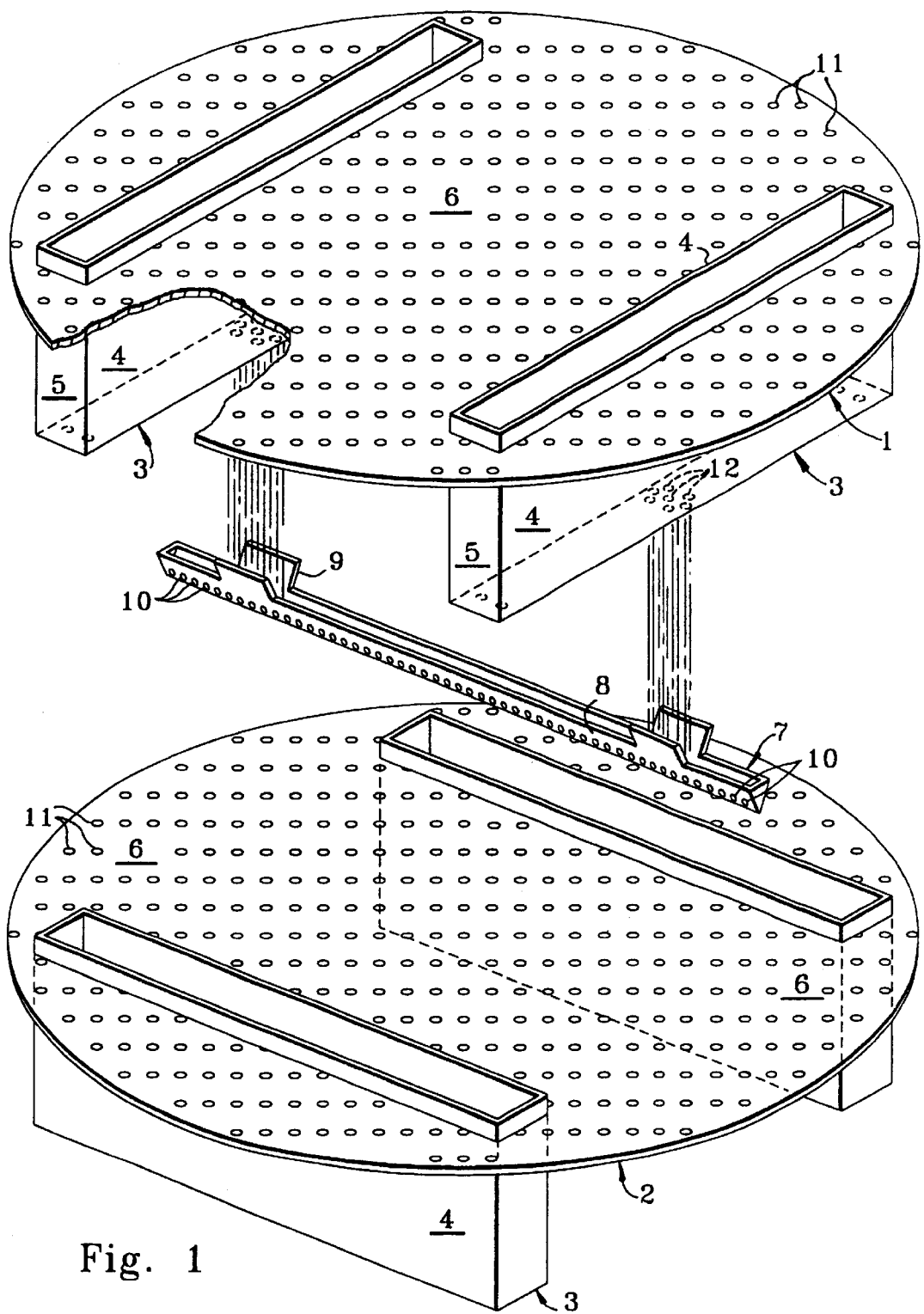
FIG. 1 illustrates the liquid flow downward from an upper first tray 1 onto the liquid distribution pan 7 and then onto the decking of the lower tray 2.

Fractionation trays are employed to perform an almost endless variety of separations in the petroleum and petrochemical industries. Fractionation trays are used, for example, in the separation of many different hydrocarbons such as paraffins, aromatics and olefins. Trays are used to separate specific compounds such as alcohols, ethers, alkylaromatics, monomers, solvents, inorganic compounds, etc. and in the separation of broad boiling mixtures such as petroleum derived fractions including naphtha. This great utility has led to the development of a wide variety to trays having differing advantages and disadvantages.

One widely used type of tray is the multiple downcomer tray illustrated in the above cited references. Multiple downcomer trays have several distinguishing physical characteristics. For instance, a multiple downcomer tray does not have the receiving pan traditionally shown on cross-flow trays. This is the normally imperforate section of tray deck located below the bottom of a downcomer. This is the area of a cross flow tray that the liquid descending through the downcomer impacts before passing horizontally onto the perforated decking of the tray. In a conventional tray the receiving pan is normally located directly below the downcomer leading from the next above fractionation tray. This differs from a multiple downcomer tray in which the horizontal surface area of the tray is divided only into areas functioning as downcomer means and flat vapor-liquid contacting area normally referred to as decking. There are no imperforate areas allocated to receiving descending liquid from the tray located immediately above.

Another distinguishing feature of a multiple downcomer type fractionation tray is the provision of a relatively large number of parallel downcomers at equal distances across the tray. Each tray can employ from one to fifteen or more such downcomers, which are of similar design. These downcomers are spaced relatively close together compared to those of the more common crossflow fractionation trays as the downcomers are spread across the surface of the tray rather than being mainly at the periphery of the tray. The distance between adjacent downcomers (measured between their side walls) of the same multiple downcomer tray will be between 0.2 and 1.0 meters and preferably less than about 0.5 meter. This results in a tray having a unique design, when viewed from above, consisting of the alternating decking areas and downcomer means evenly spaced across the upper surface of the fractionation tray.

The structure of the downcomers of a multiple downcomer tray is also unique compared to the downcomers employed upon crossflow fractionation trays. The downcomers of a multiple downcomer tray do not extend all the way down to the next lower fractionation tray. Rather, they stop at a much higher intermediate level located in the cylindrical void volume between the two trays. The downcomer descending from the tray above therefore normally stops well above the deck surface of the lower tray and above the inlet to the downcomers of the tray below. The inlets to the downcomers of a tray functions as the outlet weir of the tray, and the bottom of the downcomer is normally well above the outlet-weir of the lower tray. The horizontal ends-on cross-section of the downcomers can have a wide variety of shapes ranging from rectangular to triangular.

A very distinctive feature of a multiple downcomer fractionation tray is the provision of a liquid sealable means near the bottom of the downcomer. The bottom of the downcomer is sealed sufficiently to retard the direct downward flow of liquid out of the downcomer. This causes the accumulation and retention of froth, allowing it to separate into a clear liquid and released vapor. The accumulated liquid covers the openings in the bottom portion of downcomer and seals the downcomer to the upward flow of vapor. This liquid sealable outlet is located well above the deck of the tray located immediately below. The clear liquid collected in the lower portion of the downcomer spills forth upon the next lower tray through the openings in the bottom of the downcomer. Some liquid may, if desired, exit through openings in the downcomer side walls. The openings are preferably grouped together and with the groupings located such that the exiting liquid does not fall into a downcomer of the next lower tray.

Multiple downcomer trays have high vapor and liquid capacities and the ability to function effectively over a significant range of operating rates. Other types of trays, however, can have higher efficiencies than multiple downcomer trays. It is postulated that this is caused by the liquid falling from the downspouts of the downcomers landing on the decking of the next lower tray in a manner which leads to a variety of liquid flow path lengths and liquid retention times on the tray. This results in part from the preferred transverse arrangement of downcomers on vertically adjacent trays. This transverse arrangement results in the liquid falling from the downcomer downspouts at a number of relatively small spaced apart zones under the overlying downcomers. The spacing between these zones is equal to the spacing between the overlying downcomers. The liquid must then flow from these impact zones to the downcomer of the lower tray. Some points on the downcomer are further from the impact zones than others. It takes the liquid a longer time to flow the greater distance to those parts of the outlet downcomer of the lower tray which are between the zones at which the liquid falls upon the decking. The non-uniform liquid residence time results in a reduced tray efficiency. For instance, the continued contacting of stagnant liquid fails to promote additional mass transfer.

It is an objective of this invention to provide a multiple downcomer tray having a higher separation efficiency. It is another objective of the invention to provide a multiple downcomer tray in which the length of the liquid flow path across the tray decking is constant and uniform. It is a further objective of the subject invention to provide an improved process for separating volatile chemical compounds by fractional distillation.

The subject invention achieves these objectives by the use of one or more unique liquid collection and redistribution device(s) on each tray. These devices intercept at least a majority of the liquid from the upper tray before it can impact the decking of the lower tray and then redistributes the liquid onto the decking of the lower tray along a line parallel to the downcomers of the lower tray. Thus there is provided a liquid flowpath of uniform length from the point at which the liquid falls upon the decking to the point at which the liquid exits the tray by flowing into the open inlet of the downcomer.

Various efforts in the past to improve the performance of multiple downcomer trays have centered upon the liquid descending from the downcomers and its impact upon the tray decking. For instance, the antipenetration pans referred to above serve to intercept the liquid and distribute it over a wider area such that it does not tend to force its way through the decking perforations, which would result in liquid bypassing the lower tray and/or removing vapor perforations from use. The subject apparatus functions differently. First, it actively collects and retains liquid rather than just intercepting it. This requires the subject device to have a definite walled liquid retention volume. Second, the devices of the subject invention distribute the liquid onto the next lower tray in a very controlled, narrow elongated pattern which is aligned parallel to the downcomer inlet of the lower tray. The liquid is not allowed to simply roll off the subject device in a number of directions as occurs with a flat surfaced antipenetration pan. Therefore, the added element of the subject invention may be referred to as a liquid flow enhancement device.

By depositing the liquid in a long narrow strip equidistant between adjacent downcomers and along the entire length of the downcomers, the residence time of the liquid on the tray is equal for all of the liquid. The flow paths are parallel and there are no relatively stagnant areas. Both point and overall tray efficiencies are improved.

The overall process of the subject invention can be best described by reference to the Drawing. FIG. 1 of the Drawing is a simplified perspective view of two vertically adjacent trays of a fractionation column. FIG. 1 shows an upper multiple downcomer fractionation tray 1 and a lower multiple downcomer fractionation tray 2. The downcomers on these two vertically adjacent trays are oriented perpendicular to one another in the manner commonly employed with multiple downcomer fractionation trays. This is not required but gives many advantages such as mixing of the liquid and vapor from different portions of the tray. The downcomers of adjacent trays could be arranged at other angles such as 60 degrees. When used for the fractional distillation of volatile chemical compounds liquid, which is actually present as a highly aerated froth, rests upon the upper surface of the fractionation trays. The frothing or aeration of the liquid is caused by the upward passage of vapor through a great number of perforations 11 spread in a relatively uniform manner across the entire surface of the decking 6 of the trays. These perforations are typically small diameter circular openings, but it is known to employ a mixture of perforation types such as these "sieve" openings plus vapor directing slots or the "valves" of U.S. Pat. No. 5,975,504. The froth or liquid overflows the downcomer inlet weir at the top of the two downcomers and flows into the top of the downcomer 3. When operating correctly, the froth will disengage releasing the vapor and forming a "clear liquid" which accumulates in a lower portion of each of the downcomers. The accumulated liquid effectively seals the grouped liquid outlets 12 located at predetermined locations along the bottom portion of the downcomer. Each of the four downcomers illustrated in this figure is composed of two sidewalls 4 and two endwalls 5 arranged to form a long, narrow, box-like downcomer. The parallel sidewalls 4 are typical of the predominant construction of these downcomers. However, downcomers may be formed in a number of different cross-section shapes such as triangular or a truncated triangle, etc.

The liquid outlets 12 in the bottom plate of the downcomer 3 are arranged into spaced apart downspout groupings such that liquid emanating from a downcomer will not fall directly into the inlet of the downcomers in the next lower tray. That is, the outlets 12 of the upper tray are not located directly above the inlet of a downcomer of the lower tray. Instead these outlets 12 are located such that the liquid leaving the downcomer of the upper tray would fall upon the decking at a point between the downcomers of the next lower tray. The subject invention provides liquid collection and distribution devices 7 which are suspended at an intermediate elevation between the two fractionation trays 1 and 2. They are therefore located in a cylindrical void volume between the decking layers of the two trays. To function, their inlet must be below the downspouts of the upper tray's downcomer. They must also be above the decking of the lower tray to limit interference with the active frothing desired on the lower tray's decking. The liquid collection and distribution devices 7 may be retained in place by a wide variety of mechanical arrangements which anchor the devices 7 to either the upper tray or lower tray or to both. The distributors may also be attached to the downcomers of the above tray. Alternatively, independent horizontal members may extend across the internal volume of the fractionation column to support the distribution devices 7. The distributors 7 can also include integral extensions which reach horizontally to the inner surface of the outer wall of the fractionation column thus allowing each of the distribution devices 7 to be independently mounted within the column by attachment to the wall or to existing fractionation tray hardware. The manner in which the liquid collection and distribution devices 7 are supported within the column support is not a controlling feature of the subject invention.

The liquid collection and distribution devices 7 intercept the liquid shown leaving the bottom of the downcomers through the outlet openings 12. In a preferred embodiment each of the distributors has a number of sidewall wings 9 extending diagonally upward from the inclined sidewalls 8 to ensure that liquid does not fall past the device. In this manner the liquid from the upper tray is collected within a volume within the device 7. The liquid then flows horizontally along the length of the distributor 7. This results in a relatively even level of liquid within the distributor, with the liquid flowing out of the device 7 through a large number of openings 10 provided along the length of the side wall of the distributor device 7. The distributors are aligned parallel to the downcomer 3 of the next lower tray 2 and, therefore, the liquid egressing from the liquid collection and distribution device 7 is deposited upon the decking 6 of the lower tray 2 in a straight line parallel to the downcomers 3 of the lower tray.

If a decking panel is bordered on two sides by downcomers, it is preferred that liquid is deposited on the panel in a line half way between the downcomers. At the edge of a tray there are two crescent section shaped decking panels lying between a downcomer and the inner surface of the column wall. It is preferred that any liquid collection and distribution device above this decking section is placed nearer to the wall than to the downcomer to minimize stagnant liquid near the wall. Assuming only one distributor device 7 is used per decking panel between downcomers and that a distributor device 7 is used on each crescent section, then the number of liquid collection and distribution devices 7 will be equal to one more than the number of downcomers on a tray.

Figure 2:
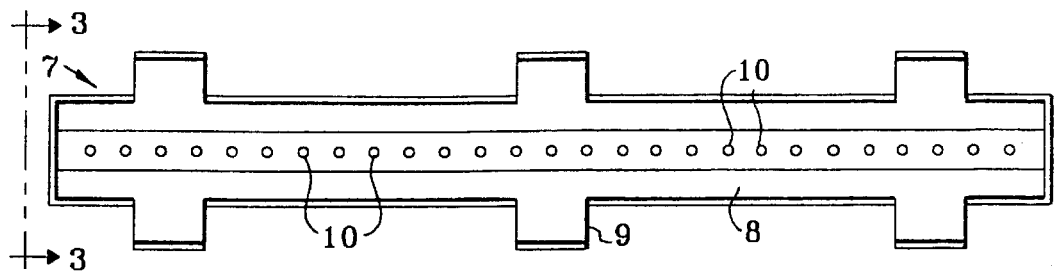
FIGS. 2, 3, 4 and 5 illustrates two of the many possible different structural embodiments of the liquid distribution pans 7 of FIG. 1.
Figure 3:
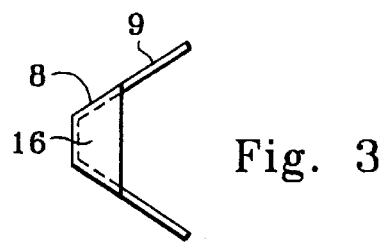

FIG. 2 illustrates flat plate (overhead) view of an alternative construction of the liquid collection and distribution or "flow enhancement" device 7. This particular form of the device has a flat bottom plate containing a single row of perforations 10. The distributor has three pairs of liquid collection wings 9. FIG. 3 is a cross-sectional view of this distributor embodiment which illustrates the end plate 16 which preferably seals the ends of the distributor.

Figure 4:
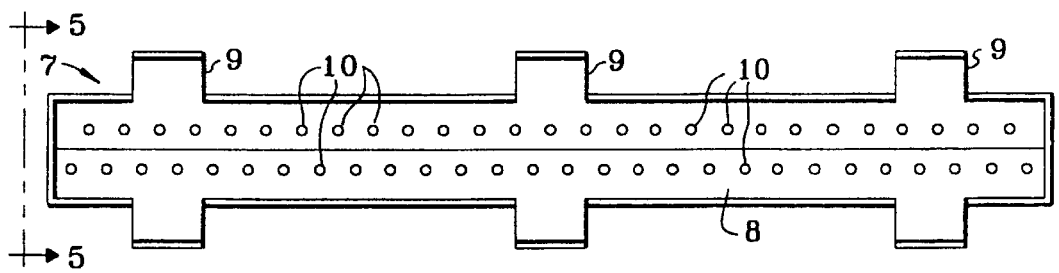
Figure 5:
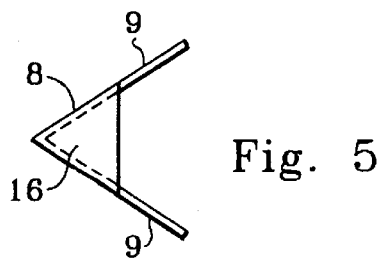

The device shown in FIG. 4 has a v-shaped end form or cross-section when viewed along its major access as shown in FIG. 5. The device is formed by two sidewalls 8 with the extending wings 9 projecting outward and upward. The slope of the wings may differ from the slope of the sidewall. The ends of each distribution device 7 are preferably capped by an end plate having a shape equal to the cross-section of the device. Thus the device has a liquid retention volume. The liquid collection and distribution device 7 of FIG. 4 has two rows of liquid outlet perforations 10.

The width of the mouth or upper opening of the distribution devices 7 is preferably about equal to the width of the inlet openings of the downcomers. The distribution devices 7 sit in the flow path of the vapor rising through the column and may interfere with the vapor flow. It is therefore preferred to minimize the overall size of the distribution devices and their impact on the rising vapor. This preference relates to the preferred use of the wings 9 which extend outward from the distribution devices. The length of these wings can be considerable and is dictated by the length of the group of liquid outlet openings 12 in the downcomer of the next higher tray. That is, longer wings are needed if the downspout area is elongated.

Figure 6:
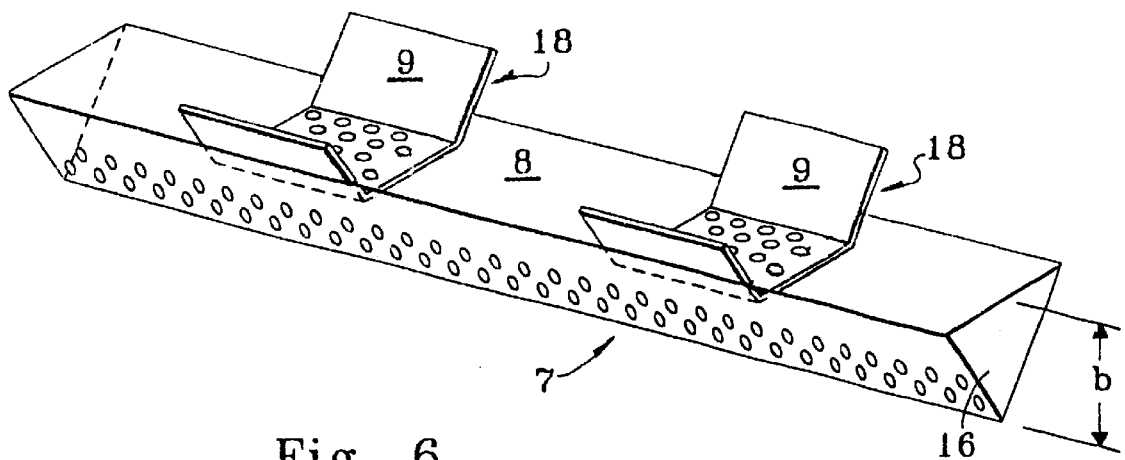
FIG. 6 illustrates a variation in the liquid distribution pan characterized by the placement of a winged bridge piece 18 over the mouth of the distribution pan 7.

FIG. 6 illustrates a triangular cross section distribution device 7 featuring a pair of winged bridge pieces 18 welded in place across the mouth of the distribution device. The bridge pieces 18 serve the same liquid collection functions as the wings 9 of FIGS. 2–4. In addition, the bridge pieces act as stiffeners and cross-braces for the device. These bridge pieces have a large number of perforations in them to allow liquid to fall through, although it is desired to intercept and slow the falling liquid which impacts them. This allows the bridge pieces to act as antipenetration pans which lessen the direct passage of liquid through openings 10 in the bottom of the distribution device itself. Retention of liquid in the distributor will also aid in this.

Figure 7:
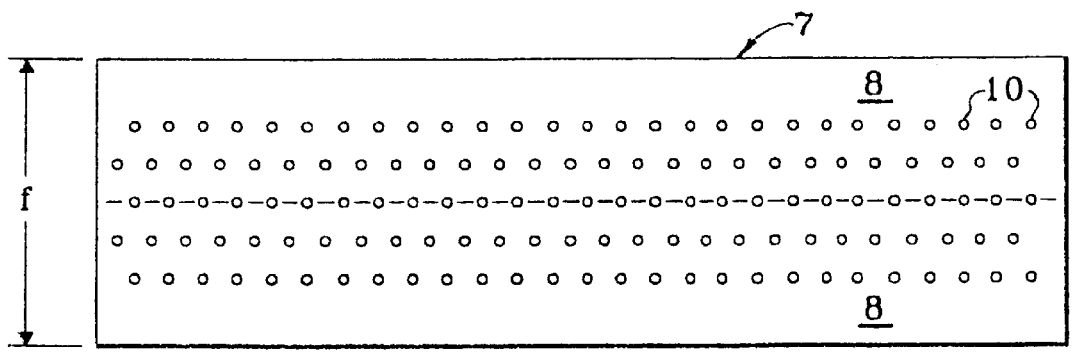
FIG. 7 illustrates the view seen looking downward into the main element of the distribution pan of FIG. 6.
Figure 8:
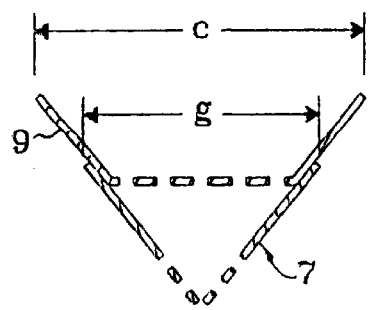
FIG. 8 is a sectional end view of the distribution pan of FIG. 6.

FIG. 7 is a "flat plate" view of the main body of the distributor 7 of FIG. 6. FIG. 8 is a sectional end view of the distributor of FIG. 6 showing the placement of the winged bridge pieces in the inlet of the distributor. As an example of possible relative sizes of the various pieces of this distributor, the top to bottom distance "b" can be about 90 mm, distance "g" about 125 mm, distance "f" about 220 mm, and distance "c" about 205 mm. In this embodiment the inclined wings 9 are attached to the distributor rather than being an extension of the sidewall 8.

Figure 9:
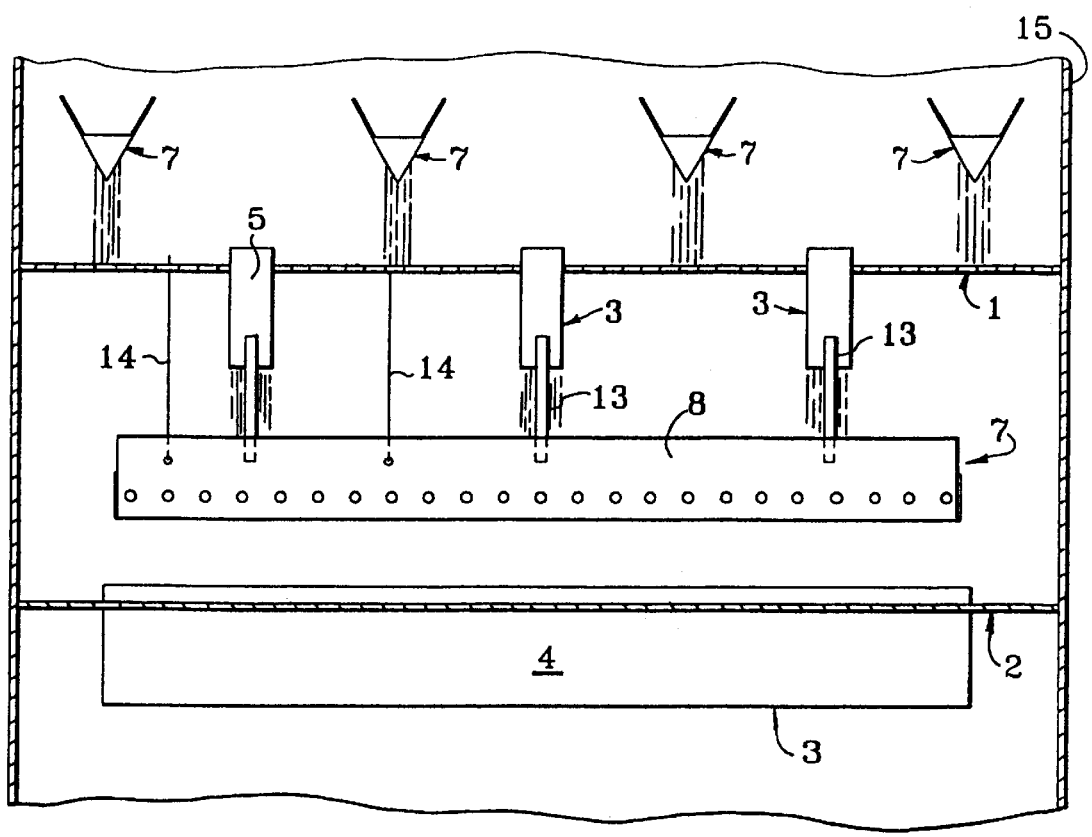
FIG. 9 is the view seen looking horizontally through a section of a fractionation column containing upper tray 1 and lower tray 2.

FIG. 9 is a view through a small section of a fractional distillation column having a cylindrical outer wall 15. The figure again shows an upper fractionation tray 1 and a lower fractionation tray 2. Both of these trays are multiple downcomer fractionation trays comprising three downcomers 3. As in the preceding FIG. 1, each downcomer is formed by the large planar imperforate sidewall 4 and a planar downcomer endwall 5. This view more clearly shows how the liquid from the four distribution devices 7 located above upper tray 1 distributes the liquid descending through the column at points intermediate the downcomers of the upper tray.

FIG. 9 also illustrates the one visible liquid collection and distribution device 7 located intermediate the upper and lower fractionation trays. The right hand portion of this device is supported by support members 13 extending downward from the downcomer of the tray above. The left hand portion of the device 7 is shown as also supported by two support rods 14 which extend upward and through the decking of the upper tray 1. The illustration of these two alternative methods of supporting the liquid collection and distribution device 7 is merely to emphasize that many mechanical ways will become apparent to those skilled in the art to support the devices. FIG. 9 illustrates that the liquid collection and distribution device 7 shown located between the two fractionation trays has a length which is approximately equal to that of the downcomer shown on the lower tray 2. Assuming the column employs trays having three or more downcomers, the downcomers will have different lengths, with shorter downcomers being located near the edge of the tray. The length of the liquid collection and distribution devices 7 will vary in the same manner.

Figure 10:
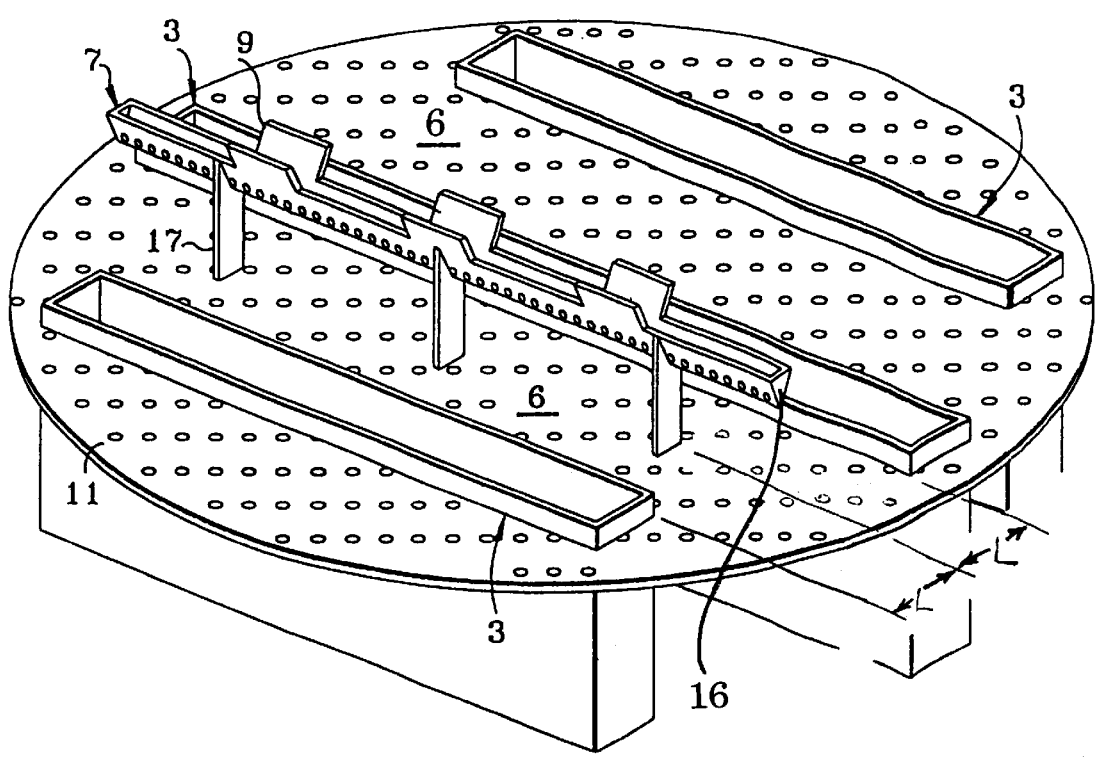
FIG. 10 presents a perspective view of a single fractionation tray having a liquid distribution pan suspended over the decking by three stanchions 17 fastened to the tray decking 6.

FIG. 10 shows the placement of a liquid collection and distribution device 7 halfway between two of the parallel downcomers 3 forming part of a tray. Preferably a tray such as this having three downcomers would be fitted with at least two distribution devices 7 between the downcomers, with the use of two additional devices in the crescent or end sections of the tray being an optional addition. The liquid collection and distribution device is supported above the generally level decking 6 of the tray by three vertical stanchions 17 attached to the decking by means not shown such as bolts or welding. This attachment can employ some of the numerous vapor openings 11 which occur in a uniform pattern across the decking. The end plate of the device 7 can be formed by a portion of a stanchion 17 attached to the end of the device. The bottom of the liquid distribution device 7 should be sufficiently above the top surface of the decking to avoid undue interference with desired vapor or liquid flows. The liquid collection and distribution device is centered between and parallel to the adjacent downcomers such that the distance "L" between the major axis of the distributor and the sidewall of the two downcomers is equal. The length of the downcomers in the tray varies to match the available chordal length across the interior of the column.

While it is normally preferred to seal the end of the distributor device 7 with an imperforate endplate 16, it is acknowledged that the geometry and tray layout at the edge of the tray may make it desirable to provide openings in the endplate. This will allow liquid to flow out the end of the device 7 and onto the edge of the tray. The purpose of this is to remove or reduce stagnant areas at the edge of the tray where liquid has an undesirably long residence time.

Figure 11:
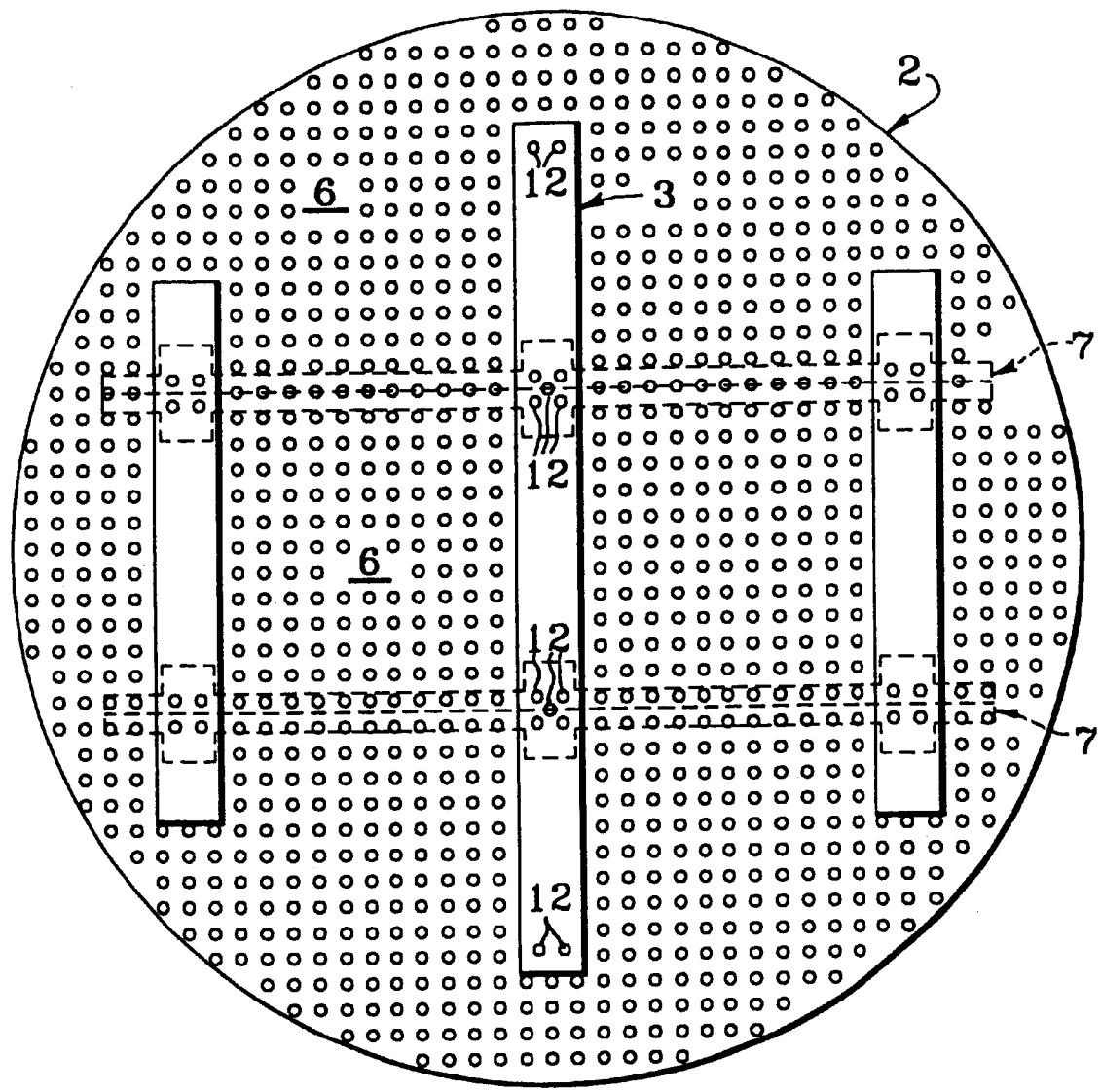
FIG. 11 is an overhead view of a tray showing the location of two distributors 7 below the tray.

FIG. 11 is an overhead view showing a multiple downcomer tray having three downcomers. Shown by the dashed lines are the locations of two distributors 7 located below the tray to collect liquid draining from the downcomer downspouts. The distributors are perpendicular to the downcomers.

The liquid collection and distribution devices of the subject invention can be employed in a new fractionation column, as part of new trays being installed in an existing column, or they may be added to multiple downcomer trays already present in a column.

A preferred embodiment of the subject invention can accordingly be characterized as a fractional distillation process which comprises passing a liquid comprising a first and a second volatile component downward through a fractional distillation column containing a plurality of vertically spaced apart multiple downcomer fractionation trays and operated at fractionation conditions which cause vapor to rise through decking areas provided on the trays while liquid is collected in at least two downcomers present on each tray, with liquid which has been collected in said downcomers exiting the downcomers through openings located in a lower portion of the downcomers; collecting liquid, which is discharged from the openings in the lower portion of two different downcomers of an upper first tray, in a liquid collection pan located between the first tray and a lower second tray and aligned parallel to a downcomer of the second tray; and discharging liquid from the liquid collection pan onto the decking area of the second tray in a uniform elongated pattern extending parallel to a downcomer of the second tray. This pattern can be in the form of a line as previously mentioned or several lines due to parallel lines of openings in the distributor. There may be minor breaks in the line(s) caused by structural considerations. The pattern, however, is elongated, centered between any two bordering downcomers and preferably approximately equal in length to the downcomers of the lower tray. The pattern can have some width, e.g. 5–15 cm to spread out the impact of the falling liquid thus avoiding penetration through the decking and retaining deck activity.

Operating conditions for a fractionation column are confined by the physical properties of the compounds being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the column of the subject process therefore include a temperature in the broad range of from about −50 to about 250 degrees C. The column must be operated at a pressure sufficient to maintain at least a portion of the feed compounds present as a liquid. High pressures require a much more costly outer vessel and accessory equipment including reboilers and overhead condensers. It is, therefore, generally desired to operate a column in the lower portion of the range of possible operating pressures unless it adversely effects the operation of the column. Fractionation pressures may range from subatmospheric pressure to a pressure up to about 35 bar.

What is claimed:

1. An apparatus for performing fractional distillation in a fractionation column, the apparatus comprising:

an upper first tray and a lower second tray, with both the first and second trays comprising a trough-like downcomer and vapor-liquid decking panels adjacent the downcomer and having at least two groups of liquid outlets in the bottom of the downcomer; and a liquid collection and distribution device mounted at an intermediate level between the downcomer of the first tray and the decking of the second tray, the liquid collection and distribution device being of sufficient length to receive liquid falling from at least two groups of downcomer liquid outlets of the first tray and having at least one row of liquid outlets aligned parallel with the downcomer of the second tray, whereby liquid from the first tray falling into the liquid collection and distribution device is distributed across a decking panel of the lower second tray at a uniform distance from the downcomer adjacent to the decking panel.

2. The apparatus of claim 1 wherein the number of liquid collection and distribution devices per tray is one greater than the number of downcomers per tray.

3. The apparatus of claim 1 further characterized in that a bridge piece is affixed across an open mouth of the liquid collection and distribution device below the downcomer liquid outlets.

4. The apparatus of claim 1 wherein two sidewalls extend the length of the liquid collection and distribution device.

5. The apparatus of claim 4 wherein the sidewalls are planar.

6. The apparatus of claim 4 further comprising spaced-apart liquid catching wing tabs, said wing tabs extending outward from the liquid collection and distribution device at the top edge of the sidewalls of the device.

7. The apparatus of claim 1 wherein the liquid collection and distribution device is supported by stanchions attached to the second tray.

8. The apparatus of claim 1 wherein the downcomer of the first tray is oriented differently than the downcomer of the second tray.

9. The apparatus of claim 1 wherein the liquid collection and distribution device is supported by attachment to at least two downcomers.

10. An apparatus for performing fractional distillation in a fractionation column, the apparatus comprising:

an upper first tray and a lower second tray, with both the first and second trays comprising at least two trough-shaped downcomers and at least one vapor-liquid decking panel located between the downcomers, and with the downcomers of the first tray being oriented differently than the downcomers of the second tray, with the downcomers of each tray having at least two groups of spaced apart liquid outlets in the bottom of the downcomer; and at least two liquid collection and distribution devices mounted between the bottom of the downcomers of the first tray and the top of the vapor-liquid decking panel of the second tray, the liquid collection and distribution devices being of length sufficient to receive liquid falling from the liquid outlets of at least two downcomers of the first tray, with the liquid collection and distribution devices being aligned parallel with the downcomers of the second tray and having liquid outlets aligned parallel with the downcomers of the second tray and above the decking of the second tray to deposit liquid onto the decking of the second tray at uniform distances from the downcomers of the second tray.

11. The apparatus of claim 10 wherein the downcomers of the first tray are oriented transverse to the downcomers of the second tray.

* * * * *